United States Patent
Franko et al.

(10) Patent No.: US 11,230,504 B2
(45) Date of Patent: Jan. 25, 2022

(54) METHOD AND SYSTEM FOR PRODUCING A FERTILIZER OR HERBICIDE FROM A WHOLE STILLAGE BYPRODUCT PRODUCED IN A CORN DRY MILLING PROCESS

(71) Applicant: Fluid Quip Technologies, LLC, Springfield, OH (US)

(72) Inventors: Michael Franko, Denver, CO (US); Neal Jakel, Cedar Rapids, IA (US); John Kwik, Bellbrook, OH (US)

(73) Assignee: Fluid Quip Technologies, LLC, Springfield, OH (US)

( * ) Notice: Subject to any disclaimer, the term of this patent is extended or adjusted under 35 U.S.C. 154(b) by 170 days.

(21) Appl. No.: 16/500,583

(22) PCT Filed: May 8, 2018

(86) PCT No.: PCT/US2018/031516
§ 371 (c)(1),
(2) Date: Oct. 3, 2019

(87) PCT Pub. No.: WO2018/231371
PCT Pub. Date: Dec. 20, 2018

(65) Prior Publication Data
US 2021/0114951 A1   Apr. 22, 2021

Related U.S. Application Data

(60) Provisional application No. 62/520,601, filed on Jun. 16, 2017.

(51) Int. Cl.
*A01N 31/00* (2006.01)
*A01N 33/00* (2006.01)
*C05F 5/00* (2006.01)

(52) U.S. Cl.
CPC .............. *C05F 5/008* (2013.01); *A01N 31/00* (2013.01); *A01N 33/00* (2013.01)

(58) Field of Classification Search
None
See application file for complete search history.

(56) References Cited

U.S. PATENT DOCUMENTS 8,017,365 B1 * 9/2011 Rein ........................ C05F 17/40
435/161
9,315,427 B2 * 4/2016 Foody .................. C13K 13/002
(Continued)

FOREIGN PATENT DOCUMENTS

WO   WO 2018/236716 A1 * 12/2018 ............. A01N 31/00

*Primary Examiner* — Wayne A Langel
(74) *Attorney, Agent, or Firm* — Wood Herron & Evans LLP (57) ABSTRACT

Method for producing a fertilizer or herbicide from a whole stillage byproduct produced in a corn dry-milling process for making alcohol and system therefore is disclosed. In one embodiment, the method includes separating the whole stillage byproduct into an insoluble solids portion and a thin stillage portion. Thereafter, the thin stillage portion can be dewatered to provide a water soluble solids portion and a dewatered protein portion, which may be optionally dried. The protein in the resulting protein portion can serve as a nitrogen source and sulfur containing amino acids can serve as a sulfur source, which can be desirable components in fertilizers and herbicides. To that end, the resulting protein portion directly may be sold and/or used as a fertilizer or herbicide or can be combined with other components to provide the fertilizer or herbicide.

17 Claims, 3 Drawing Sheets

(56) References Cited

U.S. PATENT DOCUMENTS

| | | | |
|---|---|---|---|
| 2014/0060130 A1* | 3/2014 | Purtle | C05B 17/00 |
| | | | 71/23 |
| 2015/0101378 A1* | 4/2015 | Ogle | C09J 105/00 |
| | | | 71/23 |
| 2016/0060587 A1* | 3/2016 | Hebert | A23J 1/006 |
| | | | 71/8 |
| 2016/0262389 A1* | 9/2016 | Fagan | A01N 43/08 |
| 2017/0114293 A1* | 4/2017 | Jakel | C12F 3/10 |
| 2017/0240481 A1* | 8/2017 | Blankenburg | C05G 5/20 |

* cited by examiner

METHOD AND SYSTEM FOR PRODUCING A FERTILIZER OR HERBICIDE FROM A WHOLE STILLAGE BYPRODUCT PRODUCED IN A CORN DRY MILLING PROCESS

TECHNICAL FIELD

The present invention relates generally to corn dry-milling, and more specifically, to a method and system for producing a fertilizer or herbicide from a whole stillage byproduct produced in a corn dry-milling process for making a biofuel and/or a biochemical, such as ethanol.

BACKGROUND

Wet mill corn processing plants convert corn grain into several different natural co-products, such as germ (for oil extraction), gluten feed (high fiber animal feed), gluten meal (high protein animal feed), and starch-based products, including ethanol, high fructose corn syrup, food or industrial starch. However, because constructing wet-milling plants is complex and capital-intensive, almost all new plants built today are dry mill plants.

Dry milling plants generally convert corn into only two products, i.e., ethanol and distiller's grains with solubles. A typical corn dry mill process consists of four major steps: grain handling and milling, liquefaction and saccharification, fermentation, and co-product recovery. Grain handling and milling is the step in which the corn is brought into the plant and ground to promote better starch to glucose conversion. Liquefaction is the step of converting solids such as starch to a flowable liquid producing oligosaccharides and saccharification is where the oligosaccharides are converted into single glucose molecules. Fermentation is the process of yeast or bacteria, or as clostridia, for example converting glucose into a biofuel or a biochemical, such as ethanol. Co-product recovery is the step in which the ethanol and corn by-products are purified and made market ready. There are many known chemical and biological conversion processes known in the art that utilize yeast, bacteria, or the like to convert glucose to other biofuels and biochemical components like ethanol, for example.

The recovery of alcohol, e.g., butanol, ethanol (a natural co-product), etc., and other similar compounds, generally begins with the beer being sent to a distillation system. With distillation, ethanol is typically separated from the rest of the beer through a set of stepwise vaporization and condensation. The beer less the alcohol extracted through distillation is known as whole stillage, which contains a slurry of the spent grains including corn protein, fiber, oil, minerals, and sugars. This byproduct is too diluted to be of much value at this point and is further processed to provide the distiller's grains with soluble product.

In typical processing, when the whole stillage leaves the distillation system, it is generally subjected to a decanter centrifuge to separate insoluble solids or "wet cake", which includes fiber, from the liquid or "thin stillage", which includes, e.g., nitrogen sources (protein) and sulfur sources (amino acids). After separation, the thin stillage moves to evaporators to boil away moisture, leaving a thick syrup that contains the soluble (dissolved) solids. The concentrated syrup is typically mixed with the wet cake, and the mixture may be sold to beef and dairy feedlots as distillers wet grain with solubles (DWGS). Alternatively, the wet cake and concentrated syrup mixture may be dried in a drying process and sold as distillers dried grain with solubles (DDGS). The resulting DDGS generally has a crude protein content of about 32% and is an especially useful feed for cattle and other ruminants due to its by-pass protein content. The resulting product is a natural product.

While DDGS and DWGS provide a critical secondary revenue stream that offsets a portion of the overall ethanol production cost, it would be beneficial to provide a method and system where a backend stream(s) in the corn dry-milling process can be utilized to produce one or more other products, such as fertilizers or herbicides, that can provide other or additional revenue.

SUMMARY

The present invention relates to a method and system for producing a fertilizer or herbicide from the whole stillage byproduct produced in a corn dry-milling process for making biofuels or biochemicals, such as ethanol. The corn includes nitrogen and sulfur sources that can be eventually recovered therefrom as a byproduct of the alcohol dry milling process and which can be useful as, or in, fertilizers or herbicides.

Fertilizer can be any material of natural or synthetic origin that is applied to soils or to plant tissues (usually leaves) to supply one or more plant nutrients essential to the growth of plants. Because soil may not provide the essential nutrients that a plant needs for optimum growth and production, fertilizer can be added to soil to improve the growth of plants. After a plant is placed in the soil, the plant can absorb nutrients in the soil as the plant grows. As the plant absorbs nutrients in the soil, the soil can become deficient of nutrients. Fertilizer can be used to replenish the nutrients in the soil. Plants can require six primary nutrients: carbon, hydrogen, oxygen, nitrogen, phosphorus, and potassium. Carbon, hydrogen, and oxygen can be supplied from the air and water. Nitrogen, phosphorous, and potassium can be supplied from the fertilizer. In addition to the six primary nutrients, plants can require smaller amounts of calcium, magnesium, sulfur, and micronutrients (e.g., boron, copper, and iron).

Herbicides are a known group of compounds or chemicals that prevent the successful germination of weed seeds as well as other seeds. Additionally, herbicides can kill a full-grown plant species. Herbicides work in a number of ways to either prevent the weed/plant from growing and/or germination (start of the plants growth). There are known natural herbicides such as corn gluten meal (CGM), walnut tree compounds, salts, minerals, and other organic and inorganic chemicals. Each compound/chemical works in a unique way to prevent or kill a given plant species. Specific to CGM, the natural corn based protein acts as a hydroscopic moisture adsorption that dries out a seed once it breaks open to begin its germination process. This is due to the nature of the types of proteins within the corn kernel that are concentrated into a CGM product through the traditional corn wet milling process. The storage proteins such as zein protein contain specific amino acids that are hydroscopic, i.e. they attract and bond with water. CGM is non-specific to the type of seeds it prevents from growing by adsorbing critical moisture needed for a germinating seed. Additionally, amino acids, such as glycine and threonine, are used as precursors for the synthesis of herbicides.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The present invention is directed to a method and system for producing a fertilizer or herbicide from a whole stillage byproduct produced in a corn dry-milling process for making biofuel, e.g., ethanol.

Figure 1:
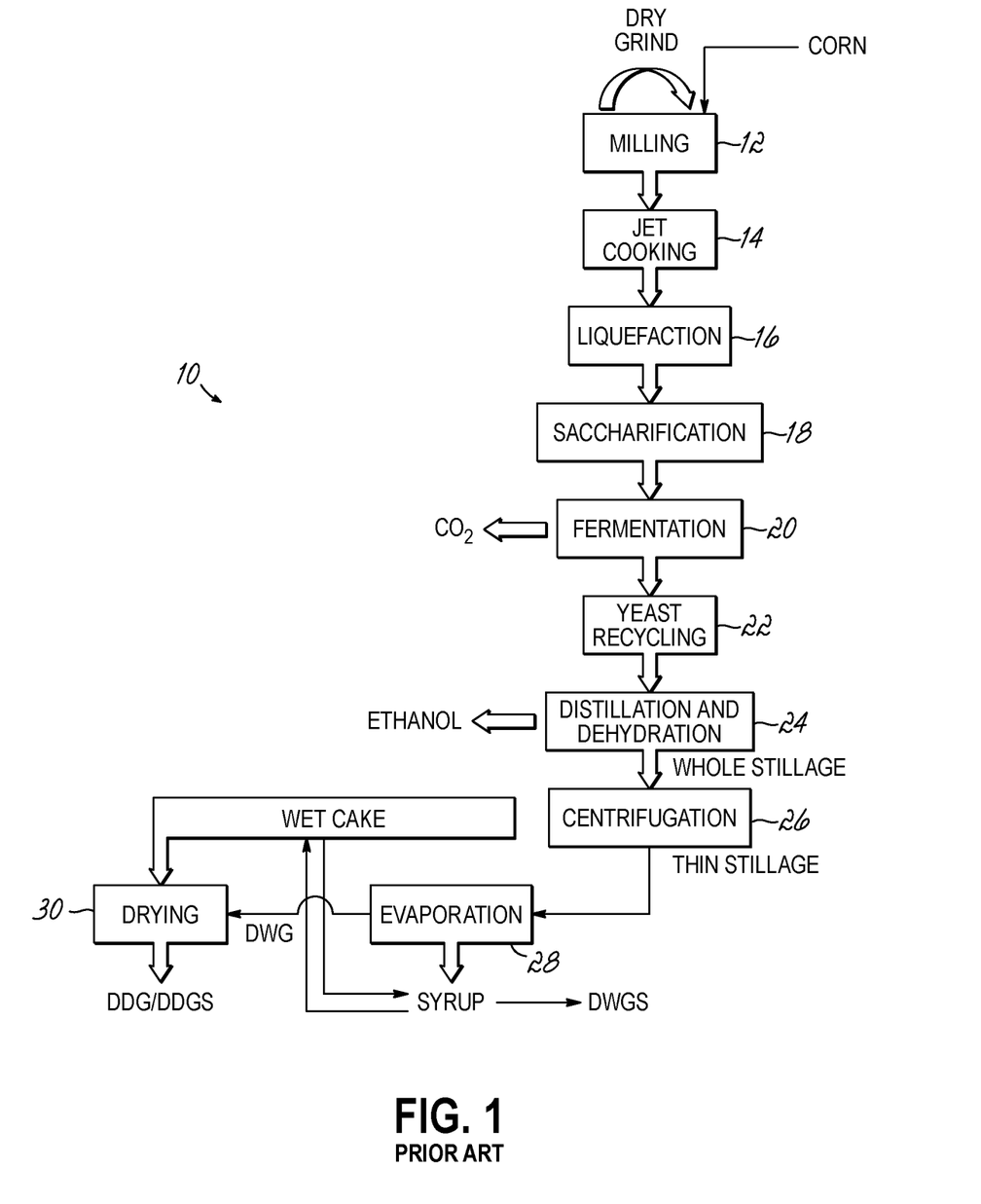
FIG. 1 is a flow diagram of a prior art dry-milling process and system for producing ethanol and distiller's grains with solubles.

FIG. 1 is a flow diagram of a prior art corn dry milling process for producing alcohol, such process is fully discussed in U.S. Pat. No. 8,778,433, entitled "Methods for producing a high protein corn meal from a whole stillage byproduct", which is expressly incorporated by reference herein in its entirety. A significant portion of alcohol, e.g., ethanol, in the United States is produced from dry milling processes, which convert corn into two products, namely ethanol and distiller's grains with solubles. Although virtually any type and quality of grain, such as but not limited to sorghum, wheat, triticale, barley, rye, tapioca, cassava, potato, and other starch containing grains can be used to produce ethanol, the feedstock for this process is typically corn referred to as "No. 2 Yellow Dent Corn."

With specific reference to FIG. 1, a typical corn dry-milling process 10 begins with a milling step 12 in which dried whole corn kernels are passed through hammer mills to grind them into meal or a fine powder. The ground meal is mixed with water to create a slurry, and a commercial enzyme such as alpha-amylase is added. This slurry is then typically pH adjusted and heated in a pressurized jet cooking process 14 to solubilize the starch in the ground meal. This is followed by a liquefaction step 16 at which point additional alpha-amylase may be added. The alpha-amylase hydrolyzes the gelatinized starch into maltodextrins and oligosaccharides to produce a liquefied mash or slurry.

This can be followed by separate saccharification and fermentation steps, 18 and 20, respectively, which may include a pH and temperature adjustment from the separate liquefaction step, although in most commercial dry-milling ethanol processes, saccharification and fermentation occur simultaneously. In the saccharification step 18, the liquefied mash is cooled and a commercial enzyme such as glucoamylase is added to hydrolyze the maltodextrins and short-chained oligosaccharides into single glucose sugar molecules. In the fermentation step 20, a common strain of yeast (*Saccharomyces cerevisiae*) is added to metabolize the glucose sugars into ethanol and $CO_2$. Other fermentation agents such as bacteria and clostridia can be utilized. Upon completion, the fermentation mash ("beer") will contain about 17% to 18% ethanol (volume/volume basis), plus soluble and insoluble solids from all the remaining grain components, including fiber, protein, minerals, and oil, for example. Yeast can optionally be recycled in a yeast recycling step 22. In some instances, the $CO_2$ is recovered and sold as a commodity product.

Subsequent to the fermentation step 20 is a distillation and dehydration step 24 in which the beer is pumped into distillation columns where it is boiled to vaporize the ethanol. The ethanol vapor after exiting the top of the distillation column is condensed and liquid alcohol (in this instance, ethanol) is about 95% purity (190 proof). The 190 proof ethanol can then go through a molecular sieve dehydration column or a membrane separation unit or similar dehydration system, which removes the remaining residual water from the ethanol, to yield a final product of essentially 100% ethanol (199.5 proof).

Finally, a centrifugation step 26 involves centrifuging, via a decanter centrifuge, the residuals or whole stillage leftover from distillation so as to separate the insoluble solids portion or "wet cake", which includes fiber, from the liquid portion or "thin stillage" portion, which includes protein, oil, etc. Next, the thin stillage portion enters evaporators in an evaporation step 28 in order to boil away moisture thereby leaving a thick syrup, which contains the soluble (dissolved) solids as well as protein and oil. This concentrated syrup is typically referred to as corn condensed distillers soluble and is mixed with the centrifuged wet cake then sold to beef and dairy feedlots as distillers wet grain with solubles (DWGS). The wet cake and concentrated syrup mixture may be further dried in a drying step 30 and sold as distillers dried grain with solubles (DDGS) to dairy and beef feedlots. The distiller's grains with solubles co-product provides a critical secondary revenue stream that offsets a portion of the overall ethanol production cost.

Figure 2:
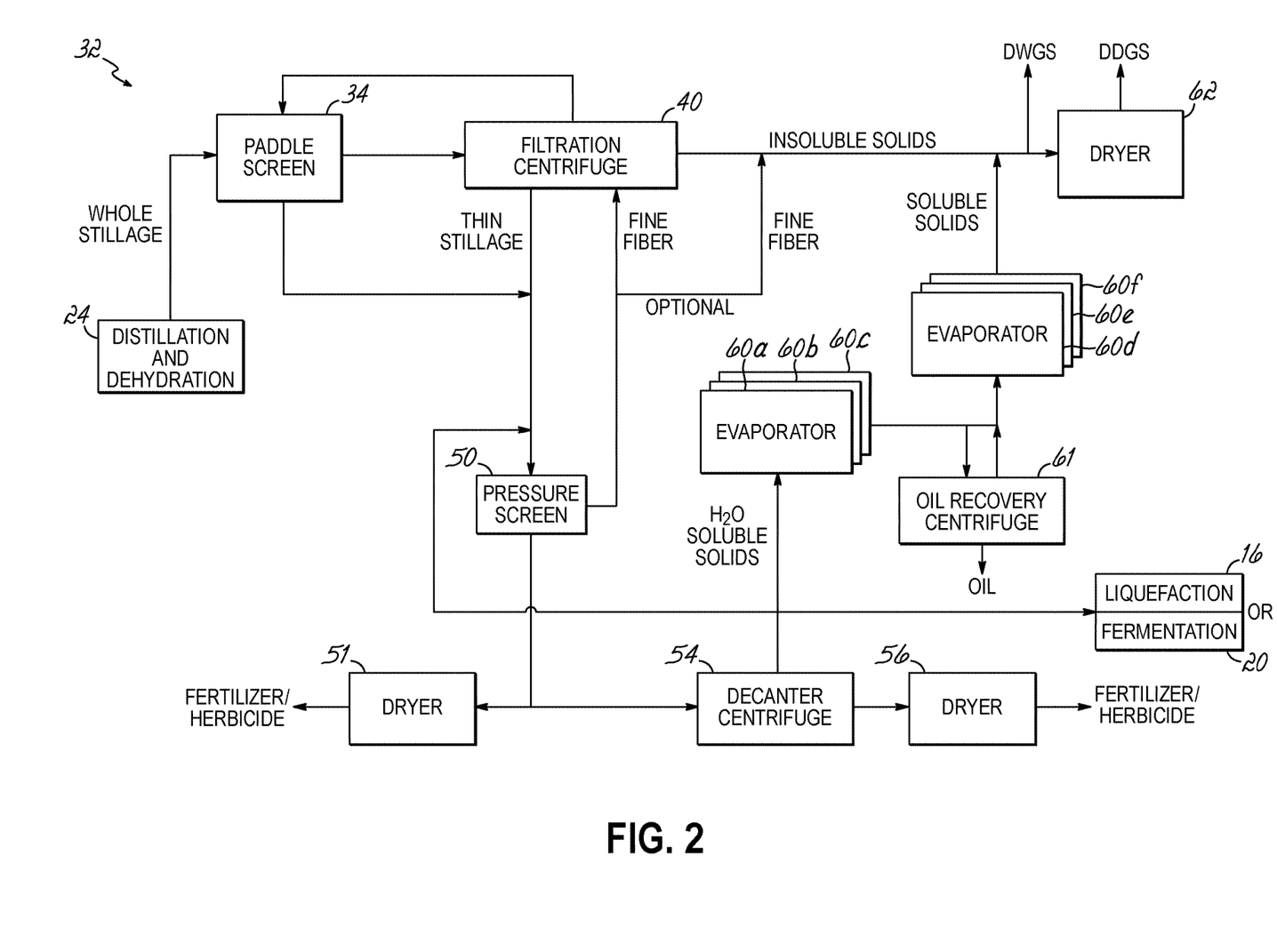
FIG. 2 is a flow diagram of a method and system for producing a fertilizer or herbicide from a whole stillage byproduct produced via a corn dry-milling process for making biofuel, e.g., ethanol, in accordance with an embodiment of the invention.

In accordance with the present invention, FIG. 2 schematically illustrates an embodiment of a method and system for producing a fertilizer or herbicide, collectively numeral 32, from the whole stillage byproduct produced in a typical corn dry-milling process 10, like that just described in FIG. 1. While a typical whole stillage byproduct is utilized here, it should be understood that the whole stillage from any corn or similar or other grain dry milling process may be utilized with the same or similar results. Again, the whole stillage byproduct contains a slurry of soluble and insoluble solids, i.e., the spent grains from the distillation and dehydration step 24, which can include sulfur-containing amino acids (sulfur sources), protein (a nitrogen source), fiber, oil, and minerals for example, that can be processed in accordance with embodiments of this invention to produce a fertilizer or herbicide. The resulting fertilizer or herbicide may be further mixed with additional fertilizer or herbicide components and/or other organic or inorganic compounds and sold and/or used as such.

With continuing reference to FIG. 2, the whole stillage byproduct can be piped from the typical corn dry mill distillation and dehydration step 24 and subjected to an optional paddle screen 34. The optional paddle screen 34 is situated before a filtration centrifuge 40, which is further discussed below, so as to aid ultimately in separation of the insoluble solids portion, e.g., fiber, from the thin stillage portion by initially filtering out desirable amounts of water, sulfur-containing amino acids (e.g., cysteine and methionine), protein, and, incidentally, small fiber fines, and yeast bodies from the whole stillage byproduct. This initial screening can help reduce the resulting load on the subsequent filtration centrifuge 40. The resulting thrus (underflow) from the paddle screen 34 eventually joins with the thin stillage underflow from the filtration centrifuge 40, as will be discussed in greater detail below.

To filter the whole stillage byproduct, the optional paddle screen 34 can include screen openings of no greater than about 500 microns. In another example, the paddle screen 34 can include openings therein of no greater than about 400 microns. In yet another example, the openings therein are no greater than about 300 microns. In yet another example, the paddle screen 34 can include openings therein of no greater than about 150 microns. And in yet another example, the paddle screen 34 can include openings therein of no greater than about 50 microns. It should be understood that these values are exemplary and that those of ordinary skill in the art will recognize how to determine the size of the openings to achieve the desired separation. In one example, the optional paddle screen 34 is a standard type paddle screen as is known in the art. One such suitable paddle screen 34 is the FQ-PS32 available from Fluid-Quip, Inc. of Springfield, Ohio. It should be understood that the optional paddle screen 34 may be replaced with other types of pre-concentration or solids separation devices, e.g., a standard pressure screen or conic centrifuge, which can perform the desired filtration/separation or preconcentration function. One such suitable pressure screen is the PS-Triple available from Fluid-Quip, Inc. of Springfield, Ohio. In addition, although a single paddle screen 34 is depicted, it should be understood that a plurality of paddle screens 34 may be situated in-line, either parallel and/or in series, and utilized for filtering the whole stillage byproduct.

The whole stillage from the distillation and dehydration step 24, if the optional paddle screen 34 is not present, or the overflow from the optional paddle screen 34 is sent to the filtration centrifuge 40 whereat the whole stillage byproduct or overflow is separated into the insoluble solids portion, which includes fiber, and the thin stillage portion, which includes sulfur-containing amino acids (e.g., cysteine and methionine), protein, oil, etc. One such suitable filtration centrifuge is described in Lee et al., U.S. Pat. No. 8,813,973 entitled "Apparatus and Method for Filtering a Material from a Liquid Medium", the contents of which are expressly incorporated by reference herein in its entirety. The filtration centrifuge 40 may be configured to perform both the initial filtering (sometimes referred to as a pre-concentration) of the whole stillage byproduct and washing of the fiber so as to clean the fiber and remove the amino acids, protein, oil, and other components that remain associated with the fiber after the initial filtration or pre-concentration.

With respect to the filtration centrifuge 40, the washing of the fiber may include a washing cycle, wherein the fiber is mixed and rinsed in wash water, followed by a de-watering cycle, wherein the wash water is separated from the fiber. The washing of the fiber may include multiple rinsing/de-watering cycles. Additionally, a counter current washing technique may be employed to save wash water usage. After washing the fiber, but before the fiber exits the centrifuge, the fiber may go through an enhanced de-watering stage, a compaction stage, and/or an air drying stage to further de-water or dry the fiber. This may increase the dryer capacity or eliminate the dryer altogether. Eventually, the washed and filtered fiber exits the filtration centrifuge 40 so that the fiber can be further processed, as discussed further below to result in a desired product, such as DWGS or DDGS. In one example, the fiber can be transported to a remote site for further processing, such as anaerobic or aerobic digestion, conversion to C5 and C6 sugar molecules for biofuel, or biochemical conversion processes. Moreover, any separated out portion of slurry from the fiber, e.g., water, amino acids (incl. sulfur containing amino acids), protein, oil, wash water, etc., which occurs via screening, is collected to define the thin stillage, then transported and further processed as described below. Optionally, a portion of the slurry and/or wash water may be piped back to the optional paddle screen 34 for further reprocessing. The filtration centrifuge 40 may provide the filtered material at a water concentration of between about 55% and about 75% water, which is a significant reduction compared to conventional filtration systems.

With continuing reference to FIG. 2, although a single filtration centrifuge 40 is depicted, it should be understood that a plurality of filtration centrifuges 40, either in parallel or series, may be situated in-line and utilized for separating the whole stillage byproduct into its insoluble solids portion (fiber) and thin stillage portion. And in an alternate embodiment, it is contemplated that the filtration centrifuge 40 can be replaced by a standard pressure screen, decanter centrifuge, a paddle screen, or other like devices as are known in the art to separate the whole stillage byproduct into the insoluble solids portion and thin stillage portion. One such suitable pressure screen is the PS-Triple available from Fluid-Quip, Inc. of Springfield, Ohio. One such suitable decanter centrifuge is the NX-944HS available from Alfa Laval of Lund, Sweden. And one such suitable paddle screen is the FQ-PS32 available from Fluid-Quip, Inc. of Springfield, Ohio.

As further shown in FIG. 2, the thin stillage centrate (underflow) from the filtration centrifuge 40 is piped to join up with the thrus (underflow) from the optional paddle screen 34 prior to or at an optional standard pressure screen 50, as is known in the art, to further aid in separation of any fine fiber from the thin stillage portion. If the optional paddle screen 34 is not present, the thin stillage centrate (underflow) from the filtration centrifuge 40 can be sent directly to optional pressure screen 50. Prior to being subjected to the optional pressure screen 50, the thin stillage can include a total solids loading of about 5% to 15% and a protein content of at least about 20% up to 30% or greater on a dry basis. Key amino acids and typical corn protein content is contained in this stream. Amino acids such as glycine and threonine among other amino acids are contained within this process stream.

Fiber having a size less than that of the screen of the filtration centrifuge 40 and/or optional paddle screen 34 may pass through and to subsequent steps of the corn dry mill process. At the pressure screen 50, the separated fine fiber can be separated from the thin stillage and piped back to the filtration centrifuge 40 whereat the fine fiber may be filtered out or optionally combined directly with the the insoluble solids portion. One such suitable pressure screen 50 is the PS-Triple available from Fluid-Quip, Inc. of Springfield, Ohio. In an alternate embodiment, the optional pressure screen 50 may be replaced with a standard paddle screen or decanter centrifuge, as are mentioned above, or other like device, to aid in separation of the fine fiber from the thin stillage portion. In addition, although a single pressure screen 50 is depicted, it should be understood that a plurality of pressure screens 50, either in parallel or series, may be situated in-line and utilized for filtering the thin stillage centrate (underflow).

After the optional pressure screen 50, the remaining thin stillage portion can include a total solids loading of about 4% to 15% and a protein content of at least about 20% up to 50% or greater on a dry basis. Key amino acids and typical corn protein content is contained in this stream. Again, amino acids such as glycine and threonine, among other amino acids are contained within this process stream. The thin stillage portion from the optional pressure screen 50 can then be piped and subjected to a decanter centrifuge 54. If the optional pressure screen is not present, the thin stillage underflow from the filtration centrifuge can be sent directly to the decanter centrifuge 54.

In another embodiment, as shown in FIG. 2, the thin stillage stream, which may or may not be subjected to the optional pressure screen 50, can be recovered and used as a fertilizer or herbicide or mixed with other components prior to use as a fertilizer or herbicide, and thus not sent to the decanter centrifuge 54. The thin stillage stream can be optionally dried, such as by being sent to a dryer 51, e.g., a spray, flash, or ring dryer, as are known in the art, and/or a crystallizer. The resulting dried product, with its protein portion, can be used as a fertilizer or herbicide or mixed with other components prior to use as a fertilizer or herbicide. The final dried product includes a total solids loading of about 85% to 97% and a protein content of at least 38% up to 50% or more on a dry basis.

With continuing reference to FIG. 2, at the decanter centrifuge 54, the thin stillage portion is dewatered to provide a dewatered protein portion, which includes protein as a nitrogen source and amino acids as a sulfur source, and a separated water soluble solids portion or filtrate, which includes oil. The decanter centrifuge 54 is standard and known in the art. One such suitable decanter centrifuge 54 is the NX-944HS available from Alfa Laval of Lund, Sweden. In addition, although a single decanter centrifuge 54 is depicted, it should be understood that a plurality of decanter centrifuges 54, in parallel or series, may be situated in-line and utilized for filtering the thin stillage underflow. In an alternate embodiment, the decanter centrifuge 54 may be replaced with a standard filter press, a rotary vacuum, a membrane filtration (macro and/or micro), or other like device, as are known in the art, to dewater the thin stillage portion and/or separate fine solids.

The separated water soluble solids portion or filtrate, which includes oil as well as minerals and soluble proteins, from the decanter centrifuge 54 may be recycled back, for example, to the liquefaction step 16, the fermentation step 20, or to the thin stillage stream prior to the optional pressure screen 50 for reuse in the dry mill process. Additionally, or alternatively, as shown in FIG. 2, the water soluble solids portion can be piped from the decanter centrifuge 54 and subjected to a set of evaporators 60*a*, 60*b*, and 60*c* (for example), as are known in the art, to begin separating the soluble solids from the water soluble solids portion. It should be understood that the number of evaporators and sets thereof can be varied, i.e., can be more or less, from that shown depending on the particular application and result desired. The evaporators 60*a-c* evaporate the liquid portion of the water soluble solids portion. Thereafter, all or a portion of the water soluble solids portion can be piped and subjected to an optional oil recovery centrifuge 61, as is known in the art, so that oil can be removed therefrom. One such suitable oil recovery centrifuge 261 is the ORPX 617 available from Alfa Laval of Lund, Sweden. In one example, the final recovered oil product can include between about 30 wt % to about 60 wt % of the total corn oil within the corn kernel. In comparison to typical oil recovery in a standard dry mill process, oil recovery centrifuge 61 can function at a higher capacity because the water soluble solids portion, which is subjected to the oil recovery centrifuge 61, includes less liquid and less protein than normal.

The water soluble solids portion from evaporators 60*a-c* or the remainder of the water soluble solids portion from the evaporators 60*a-c* and/or from the optional oil recovery centrifuge 61 can be piped and subjected to another set of evaporators 60*d*, 60*e*, and 60*f* (for example) whereat the liquid portion is further evaporated from the water soluble solids portion to ultimately yield a soluble solids portion. While the water soluble solids portion is subjected to two sets of three evaporators 60*a-c*, 60*d-f*, it should be understood that the number of evaporators and sets thereof can be varied, i.e., can be more or less, from that shown depending on the particular application and result desired. Additionally, this soluble solids stream can be further processed as a raw material feed source, such as for a bio-digester to produce biofuels and/or a biochemical, an algae feed source, or further processed, via fermentation to yield a high protein nutrient feed.

The resulting soluble solids portion may be combined with the insoluble solids portion, e.g., fiber, received from the filtration centrifuge 40 to provide distillers wet grains with soluble (DWGS), which may be further dried by a drier 62, as is known in the art, to provide distillers dry grains with solubles (DDGS), both of which can be sold to dairy and beef feedlots, or other animal markets. In another example, the soluble solids portion may be used as a natural fertilizer or herbicide.

Accordingly, in this dry mill process, neither the DDGS nor DWGS receive the typical concentrated syrup from the evaporators 60. And, despite the lower protein content, the DDGS and DWGS may still be sold to beef and dairy as cattle feed or to monogastric animal markets.

Returning now to the dewatered protein portion from the decanter centrifuge 54, this protein portion can include a total solids loading of about 20% to 35% and a protein content of at least about 40% up to 60% or more on a dry basis. Key amino acids and typical corn protein content is contained in this stream. Amino acids such as glycine and threonine among other amino acids are contained within this process stream. The protein portion may be utilized as a fertilizer or herbicide here or mixed with other components prior to use as a fertilizer or herbicide. The protein portion can be further optionally dried, such as by being sent to a dryer 56, e.g., a spray dryer and/or a ring dryer, as are known in the art, and or crystallized and then used as a fertilizer or herbicide or again mixed with other components prior to use as a fertilizer or herbicide. In another embodiment, the dewatered protein portion can be subjected to vacuum filtration, filter press, or other decanting or drying methods, as are known in the art. The final dried product includes a total solids loading of about 85% to 97% and a protein content of at least 38% up to 60% or more on a dry basis. Key amino acids, such as glycine and threonine and other typical corn protein content are contained within this final dried product.

Again, as indicated, the resulting protein product may be sold and/or used a fertilizer or herbicide, for example. The protein in the resulting protein product can serve as the nitrogen source and sulfur containing amino acids can serve as the sulfur source, which can be desirable components in fertilizers and herbicides. And as indicated above, the resulting product can be combined with other components to provide a fertilizer or herbicide. For example, the resulting product can be combined with a binder, carrier, chelator, diluent, surfactant, wetting agents, dispersing agents and other agents and components known for use in fertilizers and herbicides, including, for example, nitrogen, sulfur, boron, phosphorus, potassium, iron, copper, zinc, manganese, magnesium, swelling agents, salts, other minerals, and the like.

The binder can act to bind all of the dry ingredients when mixed with water. In one embodiment, the binder is water soluble. In another embodiment, the binder also functions as a chelator. Thus, upon application of water the binder allows the ingredients to be leached and absorbed individually and at desired rates. The carrier may be precipitated silica, colloidal silica, clay, talc, kaolin or combination thereof. The chelator, for example, can include many different ingredients such as humic acid, potassium humate, fulvic acid, amino acids, and ethylenediaminetetraacetic acid.

The fertilizer or herbicide can be produced and provided in a pelletized form, as a dry product, or in liquid form. In one example, the fertilizer or herbicide can be made by mixing the dry ingredients with water to form a wet mixture. Thereafter, the wet mixture is extruded through an extruder and cut to form a pellet. In another example, all ingredients include a dry material, which can be pelletized. The fertilizer or herbicide can be defined as a controlled release composition.

Figure 3:
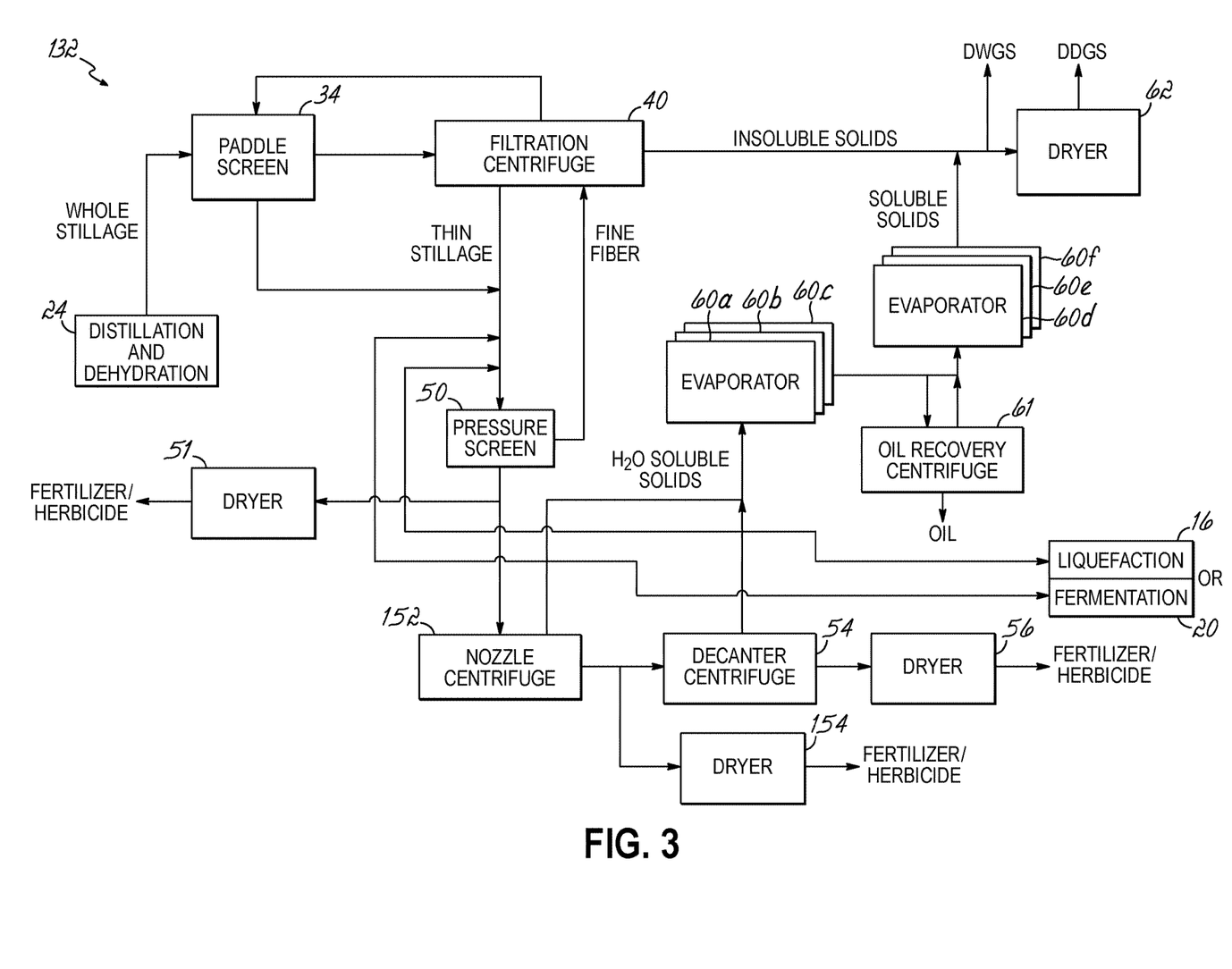
FIG. 3 is a flow diagram of a method and system for producing a fertilizer or herbicide from a whole stillage byproduct produced via a corn dry-milling process for making biofuel, e.g., ethanol, in accordance with another embodiment of the invention.

With further reference now to FIG. 3, another embodiment of a method and system for producing a fertilizer or herbicide, collectively numeral 132, from a whole stillage byproduct produced in a typical corn dry-milling process 10, is shown. In this embodiment, the stillage portion from the optional pressure screen 50, in contrast to the method and system 32 shown in FIG. 2, can be piped and subjected to an optional nozzle centrifuge 152, as is known in the art. Or if the optional pressure screen 50 is not present, the stillage underflow can be sent directly to the nozzle centrifuge 152.

The nozzle centrifuge 152 can be provided with washing capabilities so that so that water, or similar aqueous solutions or low solid centrate streams, along with the thin stillage portion, can be supplied to the nozzle centrifuge 152. The additional water allows for easier separation of the thin stillage into its protein portion and water soluble solids portion. The heavier protein portion, with its protein (nitrogen source) and sulfur-containing amino acids, separates from the water soluble solids portion and is removed as the underflow whereas the lighter water soluble solids portion, which includes oil, can be removed as the overflow. It is also noted that a two phase and/or a three phase centrifuge can be utilized in this application. One such suitable nozzle centrifuge 152 is the FQC-950 available from Fluid-Quip, Inc. of Springfield, Ohio. In an alternate embodiment, the nozzle centrifuge 152 can be replaced with a standard cyclone apparatus or other like device, as are known in the art, to separate the thin stillage portion into the underflow protein portion and overflow water soluble solids portion. One such suitable cyclone apparatus is the RM-12-688 available from Fluid-Quip, Inc. of Springfield, Ohio.

The separated water soluble solids portion or filtrate, which includes oil as well as minerals and soluble proteins, from the nozzle centrifuge 152 may be recycled back, for example, to the liquefaction step 16, the fermentation step 20, or to the thin stillage stream prior to the optional pressure screen 50 for reuse in the dry mill process. Additionally or alternatively and as further shown in FIG. 3, the water soluble solids portion can be piped from the nozzle centrifuge 152 and subjected to the set of evaporators 60a, 60b, and 60c (for example), as are known in the art, to begin separating the soluble solids from the water soluble solids portion, like that as shown in FIG. 2. It should be understood that the number of evaporators and sets thereof can be varied, i.e., can be more or less, from that shown depending on the particular application and result desired.

The separated protein portion from the nozzle centrifuge 152 can include a total solids loading of about 6% to 12% and a protein content of at least about 38% up to 55% or more on a dry basis. Key amino acids, such as glycine and threonine and other typical corn protein content are contained within this final dried product stream. In one example, as shown in FIG. 3, the protein portion here may be utilized as a fertilizer or herbicide or mixed with other components prior to use as a fertilizer or herbicide. The protein portion can be optionally dried, such as by being sent to a dryer 154, e.g., a spray, flash, or ring dryer, as are known in the art, and/or a crystallizer and then used as a fertilizer or herbicide or again mixed with other components prior to use as a fertilizer or herbicide. The resulting dried product can be used as a fertilizer or herbicide or mixed with other components prior to use as a fertilizer or herbicide. The final dried product includes a total solids loading of about 85% to 97% and a protein content of at least 40% up to 60% or more on a dry basis.

Alternatively, in another embodiment and with further reference to FIG. 3, as shown, the resulting protein portion can be sent from the nozzle centrifuge 152 to the decanter centrifuge 54 whereat the protein portion is dewatered to provide a dewatered protein portion, which includes protein as the nitrogen source and amino acids as the sulfur source. A water portion or filtrate from the decanter centrifuge 54 may be recycled back, for example, to the liquefaction step 16, the fermentation step 20, or to the thin stillage stream prior to the optional pressure screen 50 for reuse in the dry mill process, or sent to the set of evaporators 60a, 60b, and 60c (for example) to begin separating soluble solids from the filtrate like that as shown in FIG. 2.

The dewatered protein portion from the decanter centrifuge 54 can include a total solids loading of about 20% to 35% and a protein content of at least about 40% up to 60% or more on a dry basis. Key amino acids, such as glycine and threonine and other typical corn protein content are contained within this final dried product stream. As discussed above, the protein portion may be utilized as a fertilizer or herbicide or mixed with other components prior to use as a fertilizer or herbicide. The protein portion can be further optionally dried, such as by being sent to a dryer 56, e.g., a spray, flash, or ring dryer, as are known in the art, and/or crystallized and then used as a fertilizer or herbicide or again mixed with other components prior to use as a fertilizer or herbicide. In another embodiment, the dewatered protein portion can be subjected to vacuum filtration or other drying methods, as are known in the art. The final dried protein product includes a total solids loading of about 85% to 97% and a protein content of at least 40% up to 60% or more on a dry basis. Key amino acids, such as glycine and threonine and other typical corn protein content are contained within this final dried product.

And as indicated above, the resulting product can be combined with other components to provide a fertilizer or herbicide. The protein in the resulting product can serve as the nitrogen source and sulfur containing amino acids can serve as the sulfur source, which can be desirable components in fertilizers and herbicides. For example, as discussed above, the resulting product can be combined with a binder, carrier, chelator, diluent, surfactant, wetting agents, dispersing agents and other agents and components known for use in fertilizers and pesticides, including, for example, nitrogen, sulfur, boron, phosphorus, potassium, iron, copper, zinc, manganese, magnesium, swelling agents, salts, other minerals, and the like.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for producing a fertilizer or herbicide from a whole stillage byproduct produced in a starch containing grain dry milling process for making biofuel and/or a biochemical, the method comprising:
    separating the whole stillage byproduct into a thin stillage portion, including nitrogen-containing protein and sulfur-containing amino acids, and an insoluble solids portion;
    filtering the separated thin stillage portion into a nitrogen-containing protein portion, including the sulfur-containing amino acids, and a water soluble solids portion, which includes free oil, wherein the nitrogen-containing protein portion, including the sulfur-containing amino acids, is not subsequently subjected to an evaporator;
    subjecting the water soluble solids portion to evaporation via an evaporator to yield a soluble solids portion, which includes the free oil;
    recovering the separated nitrogen-containing protein portion, including the sulfur-containing amino acids; and
    mixing the recovered nitrogen-containing protein portion, including the sulfur-containing amino acids, with one or more other components prior to use as a fertilizer or herbicide,
    wherein the recovered nitrogen-containing protein portion and the one or more other components define the fertilizer or herbicide.

2. The method of claim 1, further comprising, after filtering the separated thin stillage portion into a nitrogen-containing protein portion and a water soluble solids portion, drying the nitrogen-containing protein portion including the sulfur-containing amino acids, and recovering the separated nitrogen-containing protein portion, including the sulfur-containing amino acids.

3. The method of claim 1 wherein the one or more other components are selected from a binder, carrier, chelator, diluent, surfactant, wetting agents, or dispersing agents, or combinations thereof.

4. The method of claim 1 wherein the one or more other components are selected from nitrogen, sulfur, boron, phosphorus, potassium, iron, copper, zinc, manganese, magnesium, swelling agents, or salts, or combinations thereof.

5. The method of claim 1, further comprising separating the free oil from the water soluble solids portion to provide an oil portion.

6. The method of claim 1, further comprising recombining at least a portion of the water soluble solids portion with the thin stillage portion.

7. The method of claim 1, further comprising recycling at least a portion of the water soluble solids portion back to liquefaction or fermentation.

8. The method of claim 1, wherein filtering the separated thin stillage portion into a nitrogen-containing protein portion, including the sulfur-containing amino acids, and a water soluble solids portion, which includes free oil, comprises filtering the thin stillage portion, via a decanter centrifuge, filter press, rotary vacuum, or a membrane filtration into the nitrogen-containing protein portion, including the sulfur-containing amino acids, and the water soluble solids portion, which includes free oil.

9. A method for producing a fertilizer or herbicide from a whole stillage byproduct produced in a starch containing grain dry milling process for making biofuel and/or a biochemical, the method comprising:
    separating the whole stillage byproduct into a thin stillage portion, including nitrogen-containing protein and sulfur-containing amino acids, and an insoluble solids portion;
    separating the separated thin stillage portion, via density, into a nitrogen-containing protein portion, including the sulfur-containing amino acids, and a water soluble solids portion, which includes free oil, wherein the nitrogen-containing protein portion, including the sulfur-containing amino acids, is not subsequently subjected to an evaporator;
    subjecting the water soluble solids portion to evaporation via an evaporator to yield a soluble solids portion, which includes the free oil;
    drying the nitrogen-containing protein portion including the sulfur-containing amino acids;
    recovering the dried nitrogen-containing protein portion, including the sulfur-containing amino acids; and
    mixing the recovered nitrogen-containing protein portion, including the sulfur-containing amino acids, with one or more other components prior to use as a fertilizer or herbicide,
    wherein the recovered nitrogen-containing protein portion and the one or more other components define the fertilizer or herbicide.

10. The method of claim 9, further comprising, prior to drying the nitrogen-containing protein portion including the sulfur-containing amino acids, filtering the nitrogen-containing protein portion, including the sulfur-containing amino acids, to provide a dewatered nitrogen-containing protein portion and a filtrate, and recombining at least a portion of the filtrate with the thin stillage portion.

11. The method of claim 9, further comprising, prior to drying the nitrogen-containing protein portion including the sulfur-containing amino acids, filtering the nitrogen-containing protein portion, including the sulfur-containing amino acids, to provide a dewatered nitrogen-containing protein portion and a filtrate, and recycling at least a portion of the filtrate back to liquefaction or fermentation.

12. The method of claim 9, further comprising, prior to drying the nitrogen-containing protein portion including the sulfur-containing amino acids, filtering the nitrogen-containing protein portion, including the sulfur-containing amino acids, to provide a dewatered nitrogen-containing protein portion and a filtrate, and combining at least a portion of the filtrate with the water soluble solids portion.

13. The method of claim 9 wherein the one or more other components are selected from a binder, carrier, chelator, diluent, surfactant, wetting agents, or dispersing agents, or combinations thereof.

14. The method of claim 9 wherein the one or more other components are selected from nitrogen, sulfur, boron, phosphorus, potassium, iron, copper, zinc, manganese, magnesium, swelling agents, or salts, or combinations thereof.

15. The method of claim 9, further comprising separating the free oil from the water soluble solids portion to provide an oil portion.

16. The method of claim 9, further comprising recombining at least a portion of the water soluble solids portion with the thin stillage portion.

17. The method of claim 9, further comprising recycling at least a portion of the water soluble solids portion back to liquefaction or fermentation.

\* \* \* \* \*